Sept. 16, 1969      E. C. WAHLBERG      3,467,816

PORTABLE HEATING APPLIANCE

Filed Aug. 10, 1966

INVENTOR.
ERIC C. WAHLBERG
BY
Alfred E. Miller
ATTORNEY

United States Patent Office 3,467,816
Patented Sept. 16, 1969

3,467,816
PORTABLE HEATING APPLIANCE
Eric C. Wahlberg, 32 8th St., Stamford, Conn. 06905
Filed Aug. 10, 1966, Ser. No. 571,525
Int. Cl. F27d *11/02*
U.S. Cl. 219—437      6 Claims

ABSTRACT OF THE DISCLOSURE

A portable device for heating foods and beverages which may be connected to any suitable electrical outlet, for example an automobile cigarette lighter socket. The removable cup, which may be of the disposable type, is inserted within the support ring that has a switch contact therein. Thus, when the cup is inserted in the ring the heating element is operated, but when the cup is removed from the ring the heating element becomes inoperative.

---

This invention pertains to an appliance type of device for electrically heating liquids and the like. The embodiments shown and described are directed to a device for heating liquids and can be used in conjunction with the electrical system of a motor vehicle or the like. In this device a heating element is immersed in the contents of a detachable container and by means of a container actuated switch is connected to the car electrical system when the device is plugged into the cigarette lighter socket.

One of the primary objectives of this invention is to provide an economical portable cooking device for heating food and beverages and which may be used in a passenger or truck type vehicle.

Another objective of this invention is to provide a device which, when connected to the cigarette lighter socket of the car, will heat the contents of a container in response to the immersion of the heater in the container contents as it is attached to the body of the device.

Another object of this invention is to provide a device which will percolate a liquid in a container in response to the heat generated by the heating element when connected through the container responsive switching to the electrical circuit of the car.

Another object is to provide a structure whereby the device may be connected to the electrical outlet of the vehicle electrical system in such a manner as to allow the container to remain in an upright position without regard to the angular mounting position of the electrical outlet.

Another object is to provide an electrical connection to the heater element only when the element is immersed into a minimum amount of liquid.

Another object of the invention is to provide a device for heating liquids in a disposable container.

Another object is to provide a cooking device adaptable for use in a vehicle which is compact, storable and electrically safe.

Other objects and advantages of this invention will be apparent from the following description and claims wherein the construction, arrangement and cooperation of the several parts of the invention are set forth.

Figure 1:
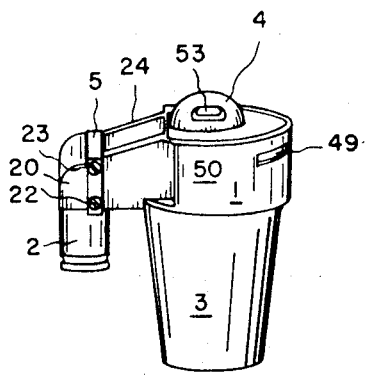
FIGURE 1 is a front perspective view of the invention.

Referring to FIGURE 1, the heater assembly 50 comprises in general an annular body 1 up into which may be inserted a cup 3 which may be of the disposable type, a cover 4, a plug 2 which fits a car cigarette lighter socket and rotatably mounted to the body 1 by hinge section 20 about screw 22 and capable of being locked in desired position by screws 22 and 23, and supporting ribs 24.

Figure 2:
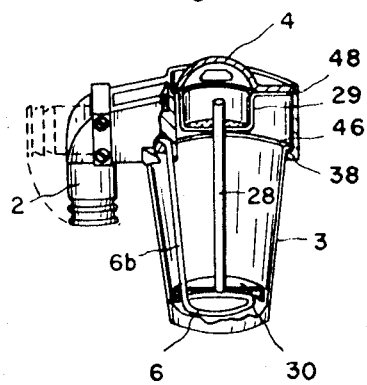
FIGURE 2 is a partial cross section of FIGURE 1 showing the percolating and heating means mounted in the body and extending into a container.

Referring to FIGURE 2, the heater element 6b is mounted in body 1 and extends down into cup 3 so that heater loop 6 is relatively close to the bottom of the cup. The heat retaining disc 30 is located above the heater loop 6 and by means of tube 28 is connected to sieve cup 29 in a fashion well known to the art, to provide a path for liquid flow from the heater loop 6 to the sieve 29. A domed cap 4 is provided to direct the liquid flowing out of the tube into the sieve 29. Sieve 29 is mounted on lip 48 of body 1 as is cap 4. Plug 2 is in the downward position with its rotation shown in phantom.

Figure 3:
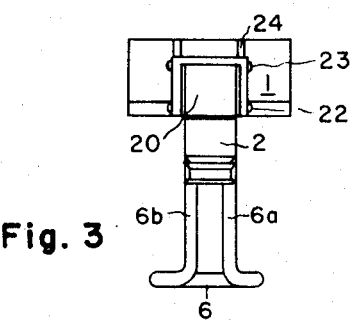
FIGURE 3 is a view of FIGURE 1 viewed from the plug side and with the container and percolating device removed.

Referring to FIGURE 3, plug 2 is attached to hinge 20 which is rotatably mounted to body 1 by means of screws 22 and locked in fixed position by screws 22 and 23. Heater legs 6a and 6b of heater loop 6 extend upward into the body behind plug 2.

Figure 4:
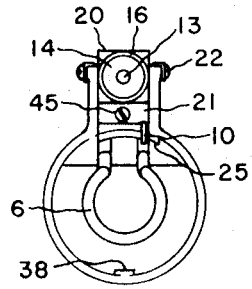
FIGURE 4 is a view of the bottom of FIGURE 3 showing the heating element, the switch arm and the plug in relative position in the body of the device.

Referring to FIGURE 4 the legs of heater loop 6 are held in body 1 by means of extension 26 and clamp 21 which is attached to body 1 by means of 45. Switch lever 10 extends inwardly of the body 1 in free moving relationship with clamp 21. Lips 38 and 25 extend inwardly from the circumference of the body and are used to retain the cup 3 of FIGURE 1 in position for heating of liquid by loop 6.

Figure 5:
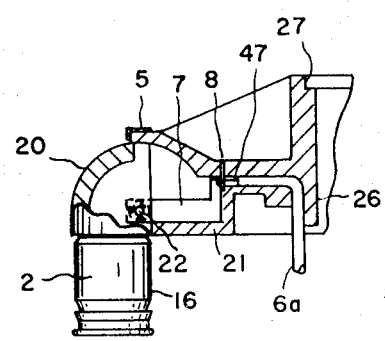
FIGURE 5 is a cross section of a portion of the body of the device showing the mounting and connection of the heater element to the body and the plug.

Referring to FIGURE 5, heater leg 6a is held in position in body 1 by clamp 21 and heating element 47 is connected to lead strip 7 which is mounted in slot 8 in body 1 and held in position by clamp 21. The end of the strip 7 is electrically connected to plug 2 by means of screw 22 in clamping plug in position to the body.

Figure 6:
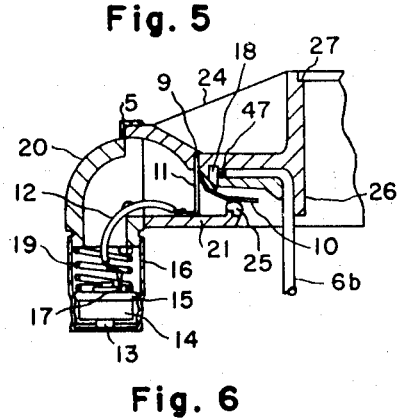
FIGURE 6 is a cross section of a portion of the body and the plug showing the mounting of the other end of the heater element together with the container actuated switch means and connections to the plug electrical terminal.

Referring to FIGURE 6, leg 6b of heater loop 6 is held in mounting position in body by extension 26 and clamp 21. The heating element is connected to contact 18 which is held in position in a slot in the body by clamp 21. Moveable switch arm 10 of contact strip 11 is held in position in slot 9 in body by means of clamp 25. One end of lead 12 is attached to moveable switch arm 10 and the other end is attached to plug contact 13 by means of lug 17. Contact 13 is mounted in insulator 14 in plug casing 16. Insulator 14 has a rim 15 around the inner edge which is larger than the narrow portion but smaller than the larger portion of the inside diameters of the casing. Casing 16 is spun assembled to the hinge 20 to make the assembly complete when attached to the body as described above. Lip 25 is used to provide partial support to cup 3.

Figure 7:
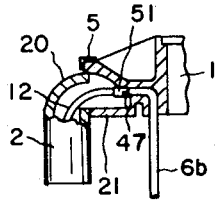
FIGURE 7 is a cross section of a portion of the body of the device showing a second method of mounting and connecting of one end of the heater element to the plug.

Referring to FIGURE 7, heater loop 6b is held in position in body 1 by clamp 21 and the heater element is connected to lead 12 by means of connector lug 51.

Figure 8:
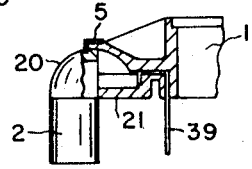
FIGURE 8 is a cross section of a portion of the body of the device showing a second method associated with FIGURE 7 in which the mounting and connection of a liquid level switch is shown.

Referring to FIGURE 8, electrode 39 is held in place in body in the same manner as described for heater leg 6a above. Also it is attached in the same manner electrically to plug 2.

Figure 9:
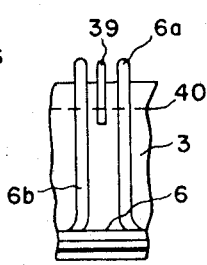
FIGURE 9 is a view showing the relationship of the heater element and the liquid level electrode with respect to the container and the liquid.

Referring to FIGURE 9, heater loop 6 and legs 6a and 6b together with electrode 39 are in spaced relationship to each other and to the contents level 40 of cup 3.

Figure 10:
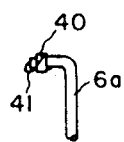
FIGURE 10 is a view of one end of the heating element showing the electrical connection of one end of the element associated with the method of mounting of the other end shown in FIGURE 7.

Referring to FIGURE 10, casing of heater leg 6a is connected to heater element 41 by means of connector lug 40.

OPERATION

The plug 2 is adjusted angularly by means of the screws 22 and 23 to reflect the angle of the cigarette lighter socket. This adjustment is such as to leave the body 1 in a horizontal position with the heater element pointed downwardly. A container 3 is filled to a predetermined height such as shown as the line 40 and inserted upwardly into the body until rim 46 of the container rests on the lips 38 and 25. In doing so the heater loop 6 will be positioned in the liquid in the lower portion of the container. As the container is pushed into position as described above, the lip 46 of the container pushes switch arm 10 against stationary contact 18. The circuit is then made between cigarette lighter socket and contact 13, to lug 17, wire 12, switch arm 10, contact 18, heater element 47, in heater loop 6 and legs 6a and 6b, lead strip 7, contact screw 22 and plug casing 16 to cigarette lighter socket ground circuit. The heater loop 6 transfers heat from resistance wire 47 to the liquid in the container 3. Thus the liquid in the container is heated to the desired level and container 3 is removed from the body by pulling it downwardly from the body. When the container leaves the lip 25, switch arm 10 moves away from the contact 18 to open the circuit and remove the current flow to the heater element 47. This provides a means of automatic protection from overheating and burnout of the heater coil when the container of liquid is removed from the body even though the plug is still connected to the socket.

Should a liquid such as coffee require percolation to become more tasty or satisfactory to a person, an assembly like these well known to the art, consisting of a disc 30, tube 28 and sieve 29 may be inserted into the body as shown in FIGURE 2. The coffee is put into sieve structure and the operation is repeated as described above for any liquid. The liquid will flow in the well known manner from under the disc 30 up to the tube 28 into the contents of sieve cup 29 and drip down into contents of container 3. A cover 4 with a dome is provided over the sieve to facilitate the diffusion of the liquid from the tube 28 over the contents of the sieve 29. An opening 49 is provided in the circumference of the body to inhibit the formation of pressure in the heating chamber during heating of the liquid.

A further safety feature can be provided by means of an additional electrode 39 being used in conjunction with the height of the liquid of the container and the heating element 41 as a switch, FIGURES 7, 8, 9, 10. The switch mentioned above is not an essential part in this embodiment though it can be used in it. When the liquid is high enough in the container 3, as shown by line 40 in FIGURE 9, it will make electrical connection between the electrode, the fluid and leg 6a. The heater element 41 has been connected to the leg 6a by means of clamp lug 47. The heater circuit now becomes as before to the heater element 41 but then goes to the loop leg 6a and liquid in the container to electrode 39 and thence, as before, to the plug casing 16 and to ground circuit of lighter socket in the car. Thus if originally, not enough liquid was put into the container the circuit would not be completed and heating does not occur. If the liquid should boil away so that the level is below the electrode the heating current will be interrupted.

From the description and the drawings it is evident that many forms and designs as well as applications other than to that of autos may be devised by those skilled in the art.

From the foregoing it will now be seen that there is herein provided an appliance type device for electrically heating liquids that can be used in conjunction but not limited to a cigarette lighter socket of an automobile which accomplishes all the objects of this invention, and others, including many advantages of practical utility and commercial importance.

As many embodiments may be made of this inventive concept as obtain within the purview of this invention as desired by those skilled in the art without departing therefrom, therefore, it is to be understood that all matter herein is to be interpreted merely as illustrative and not in a limiting sense.

I claim:

1. A portable liquid heating device adapted to be operatively connected to a power source comprising: a housing, an annular member mounted on said housing, a liquid container removably fastened in an opening of said annular member, electrical heating means mounted in said housing and having a part thereof extending below the liquid level in said container, said part heating said liquid, and a switch member mounted in the edge of said opening of said annular member, said switch member being closed by the assembly of the container in the opening of said annular member to connect said switch member with said power source, and said switch member being opened by the removal of said container from the opening of said annular member and thereby disconnect said switch member from the power source.

2. A portable liquid heating device as claimed in claim 1, wherein said annular member has a plurality of projections extending inwardly from the rim of said annular member for receiving and frictionally holding said container.

3. A portable liquid heating device as claimed in claim 1 wherein said container is disposable.

4. A portable liquid heating device as claimed in claim 1 wherein said means for connecting said heating means to a power source additionally includes a fluid-operated switch projecting into said container which is responsive to the height of the liquid in said container.

5. A portable liquid heating device as claimed in claim 2 wherein one of said projections is located directly under said switch.

6. A portable liquid heating device adapted to be operatively connected to a power source comprising: a housing, an annular member mounted on said housing, a liquid container removably fastened in an opening of said annular member, electrical heating means mounted in said housing and having a part thereof extending below the liquid level in said container, said part heating said liquid, said housing being constituted of a first part having said annular member, a second part, an electrical connection on said second part for electrically connecting said heating means with said power source, and a hinge connecting said first and second parts whereby said parts may be adjusted to various selected angles relative to each other, and a lock for locking said first and second parts at their selected positions.

References Cited

UNITED STATES PATENTS

| | | | |
|---|---|---|---|
| 2,483,879 | 10/1949 | Morrill | 219—437 |
| 3,084,614 | 4/1963 | Blanding et al. | 219—437 |
| 3,096,427 | 7/1963 | Wildberger | 219—437 X |
| 3,247,360 | 4/1966 | Ponder | 219—436 |

BERNARD A. GILHEANY, Primary Examiner

H. B. GILSON, Assistant Examiner

U.S. Cl. X.R.

219—435